Dec. 2, 1952 K. R. SCHOLFIELD 2,619,886
TRACTOR MOUNTED CULTIVATOR
Filed March 27, 1946 2 SHEETS—SHEET 1

INVENTOR.
KEITH R. SCHOLFIELD
BY
ATTORNEYS

Dec. 2, 1952  K. R. SCHOLFIELD  2,619,886
TRACTOR MOUNTED CULTIVATOR
Filed March 27, 1946  2 SHEETS—SHEET 2

INVENTOR.
KEITH R. SCHOLFIELD
BY
ATTORNEYS

Patented Dec. 2, 1952

2,619,886

UNITED STATES PATENT OFFICE 2,619,886

TRACTOR MOUNTED CULTIVATOR

Keith R. Scholfield, East Moline, Ill., assignor to Deere & Company, Moline, Ill., a corporation of Illinois Application March 27, 1946, Serial No. 657,484

2 Claims. (Cl. 97—47)

The present invention relates generally to agricultural implements and more particularly to row crop machines, such as cultivators and the like.

The object and general nature of the present invention is the provision of a new and improved tractor mounted cultivator in which improved vision for the operator is provided, and another important feature of the present invention is the provision of a one row cultivator adapted to be mounted on a four wheeled tractor designed to straddle the plant row, the forward tools of the cultivator being particularly constructed and arranged to accommodate the lateral swing of the front wheels when making a sharp turn. In this connection it is a further feature of this invention to provide new and improved means for adjusting the front tools laterally, relative to the other tools, without interferring with the front wheels either in their straight ahead position or when making a sharp turn.

A further feature of this invention is the provision of a new and improved mounting for the cultivator shields. Another feature of this invention is the provision of means providing for lateral adjustment of the front tools relative to the rear tools, with the cultivator shields adjustable laterally with the front tools, the front tools being those which operate closest to the plants in the row being cultivated.

These and other objects and advantages of the present invention will be apparent to those skilled in the art after a consideration of the following detailed description, taken in conjunction with the accompanying drawings, in which Figure 1 is a perspective view showing the front portion of a tractor, with a cultivator incorporating the principles of the present invention mounted thereon.

Figure 1:
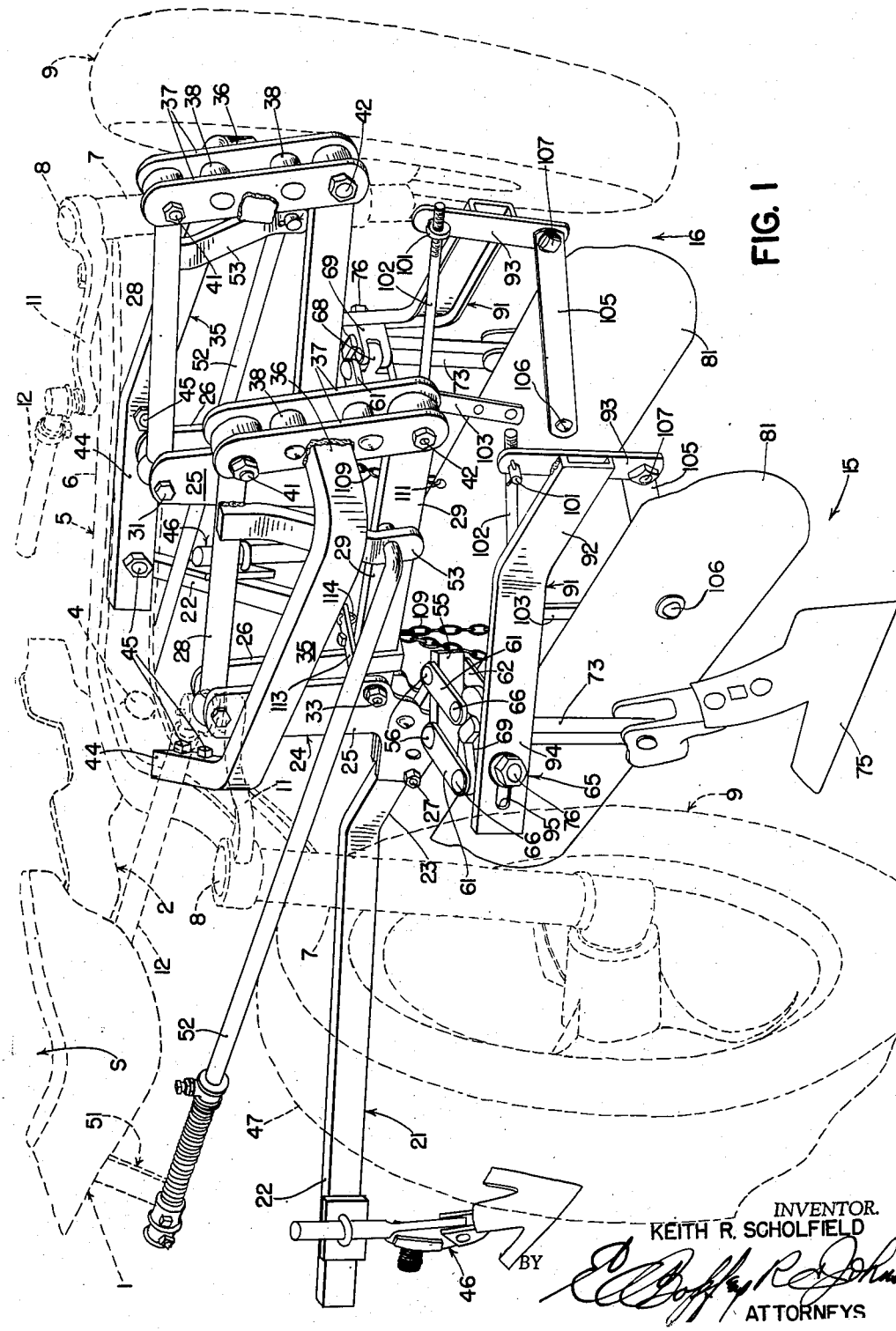

Referring now to the drawings, particularly Figure 1, the tractor on which the cultivator of the present invention is mounted is indicated in its entirety by the reference numeral 1 and comprises a tractor frame which includes a generally U-shaped frame bar 2 arranged with the sides thereof extending rearwardly and supported upon rear traction wheels (not shown). At the front end of the tractor frame bar 2 is suitable bearing means receiving a heavy shaft member 4 which is secured, as by welding, to the rear portion of a generally Y-shaped fore truck 5. The latter includes a front axle 6 having arm portions diverging forwardly and, at their forward ends, receiving vertically disposed sleeves 7 in which spindles 8 having dirigible wheel structures 9 are disposed, respectively. At the upper end of each of the spindles 8 is a steering arm 11 connected by a ball and socket connection to an associated steering rod 12. The fore truck 5 is capable of pivoting about a longitudinal axis on the main tractor frame, and by virtue of this pivotal connection, the tractor front end is sufficiently flexible to follow the uneven contour of the ground and to distribute the weight of the front part of the tractor upon the two front wheels. This construction is substantially the same as that shown in the United States Patent 2,378,615, issued June 19, 1945 to Theophilus Brown, to which reference may be made if desired.

The present invention is more particularly concerned with a new and improved tractor mounted cultivator for a tractor of the type just described, and a detailed description of my cultivator will now follow. According to the principles of the present invention, my new and improved cultivator comprises right and left hand units indicated generally by the reference numerals 15 and 16. Since the right and left hand units 15 and 16 are substantially identical, for all practical purposes, except that certain parts may be left hand or right hand, as necessary, a description of one of the units will suffice for a complete understanding and the corresponding parts of the other unit will be indicated by the same or corresponding reference numerals.

The right hand cultivator unit 15 comprises a rig beam 21 which extends underneath the tractor axle 6 and includes a rear diagonally outwardly extending section 22 and a front generally longitudinally extending section 23. The latter section carries a bracket structure 24 which is made up of a pair of substantially identical plates 25 and 26 bolted, as at 27, to the rig beam section 23 and extending generally upwardly therefrom. By virtue of suitable spacers or the like, the bracket plates 25 and 26 are held in spaced apart relation and receive the rear ends of a pair of generally parallel vertically spaced longitudinally extending draft links 28 and 29. The upper link 28 is preferably in the form of a round rod having front and rear apertured ends, the rear end receiving a pivot bolt 31 (best seen in the left hand unit 16). The lower link 29 is preferably in the form of a rectangular bar, the rear end of which is apertured to receive a pivot bolt 33 similar to the pivot bolt 31 mentioned above. The front ends of the vertically spaced parallel links 28 and 29 are pivotally connected at their forward ends with a forwardly extending frame bar member 35. This member comprises a front laterally directed section 36 to which a pair of laterally spaced apart plates 37 are fixed, as by welding. These plates are maintained in spaced apart relation by bushings or spacers 38 and at their upper and lower ends are apertured to receive pivot bolts 41 and 42 by which the forward ends of the parallel links 28 and 29 are pivotally connected for generally vertical swinging movement. The main body of the frame bar 35 extends generally longitudinally, the rear section 44 of which is bent into such an angular position that it fits snugly against the associated diagonal section of the divergent front axle member 6, relatively heavy bolts 45 being employed for firmly fixing the frame bar 35 to the associated outer portion of the front axle 6. The diagonal portion 22 of each of the rig beams 21 carries one or more cultivating tools 46, these being of generally conventional construction and arranged so that one of them is substantially directly behind the associated front wheel 47, the other being laterally inwardly thereof. The tractor 1 is provided with lifting mechanism which includes an arm 51 at each side of the tractor, and this arm is connected by a lifting link 52 with a depending arm 53 which is fixed, as by welding, to the upper link 28. It will be noted that the link 52 extends generally longitudinally underneath the front axle 6, and that when the arm 51 is swung generally forwardly the rig beam 21 and associated parts are forced downwardly, and when the operating rod 52 is drawn rearwardly, the rig beam 21 and associated parts are raised, as into a transport position.

Figures 2, 3, 4:
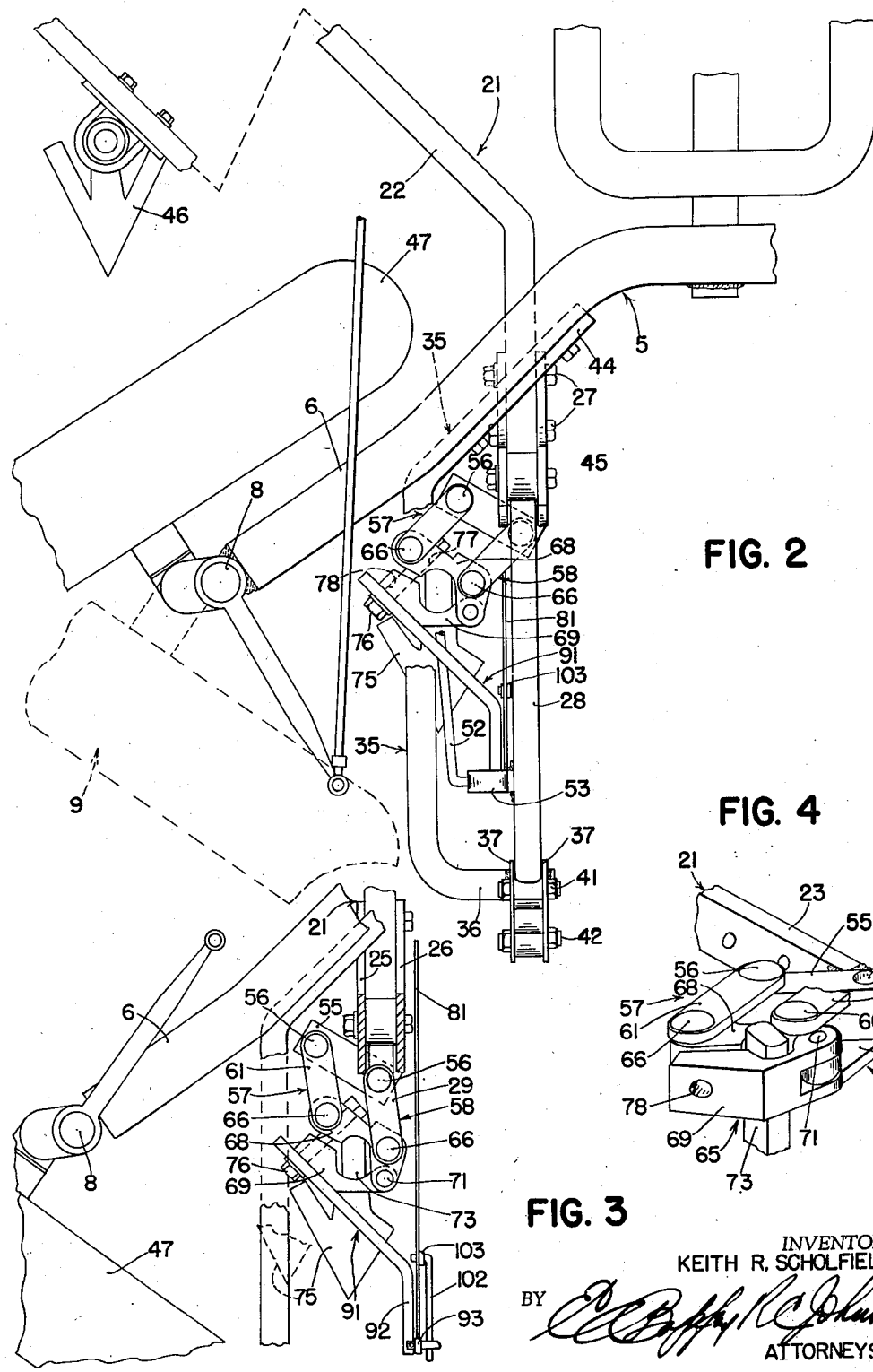
Figures 2 and 3 are fragmentary plan views of the mounting for the front tools, showing the front tool mounting in two different positions.
Figure 4 is a detail perspective view of the front tool supporting links.

As best shown in Figures 3 and 4, secured to the forward end of the front section 23 of each rig beam 21 is a head or block 55 which is disposed at an angle and provided with two apertures 54 adapted to receive a pair of pivot bolts 56. A pair of parallel links 57 and 58 are pivotally connected at their rear ends to the pivot bolts 56, each pair of links comprising two strap members 61 and 62, and the rear ends of the straps 61 and 62 are apertured to receive the pivot bolts 56. A clamp device 65 is apertured to receive a pair of pivot bolts 66, substantially identical with the above mentioned pivot bolts 56, and the forward ends of the straps 61 and 62 are apertured to receive the pivot bolts 66. The clamp device 65 comprises a pair of members 68 and 69 hingedly connected together, as by a pivot 71. Each of the members 68 and 69 is provided with a notch shaped to receive a shank 73 of a front cultivator tool 75. A bolt 76 extends through openings 77 and 78 in the members 68 and 69 and when tightened serves to firmly and rigidly secure the shank or standard 73 in place. The lower end of each of the pivot bolts 56 and 66 receive nut members which may be firmly tightened so as to prevent any movement of the links 57 and 58, whereby the front tool 75 is held in the predetermined or desired position, relative to the rig beam 21 and the tools associated therewith, and also relative to the adjacent front wheel 47. If it should be desired to change the position of the front tool 75, to bring it closer to or farther away from the plant row, all that it is necessary to do is to loosen the pivot bolts 56 and 66, shift the tool manually to the desired position, and then tighten the pivot bolts. The block 55 and the clamp device 65 comprise relatively movable parts, the part 55 being fixed to the beam section 23 and the other part 65 being shiftable generally laterally relative thereto by virtue of the generally parallel links 57 and 58. The device 65 constitutes a tool and shield-carrying part, more specific reference to the shield carried by the part 65 being made below.

It will be observed from Figures 2 and 3 that the path of movement of the laterally adjustable front tool 75 is such that in any position of the tool the associated front wheel 47 may be steered through its entire range from a sharp turn in one direction to a sharp turn in the other direction, without interfering with the wheel or any other parts. It will be observed that since the front tools are underneath the axle 5 and adjacent the front wheels there is only a limited space available to provide for different positions of adjustment of the front tools, and by mounting them on parallel links arranged as described above, the front tool may be disposed in different positions without danger of causing interference with any other parts of the implement and/or tractor.

The cultivator of the present invention is preferably provided with a pair of cultivator shields or fenders 81 disposed laterally inwardly on the front tools 75. In order to provide for mounting the cultivator shields without interfering with any of the cultivator parts or with the excellent vision of the plant row afforded by the tractor and cultivator construction as illustrated, I provide a shield supporting member 91 for each of the cultivator rig beams 21. Each shield supporting member 91 is in the form of a channel having a front longitudinal section 92 which carries a vertical bracket section 93 at its forward end, the bracket 93 preferably being welded to the front end of the cultivator support 91. The rear portion 94 of each cultivator supporting bar 91 is bent so as to angle laterally outwardly and rearwardly, being provided with a slot 95 and arranged so that the upper and lower flanges of the bar 91 overlap the forward clamping member 69, the slot 95 receiving the bolt 76 that serves to connect the two clamp parts 68 and 69 together. The upper and lower ends of the bracket 93 are apertured. The upper end of each bracket 93 receives a swivel eye 101 in which the forward threaded end of an upper link 102 is adjustably connected. The rear end of the link 102 is pivotally connected with the upper end of a clip 103 which is fixed, as by rivets, to the associated shield 81. A lower link 105 is pivoted, as at 106, to the associated shield 81 and at its forward end is pivoted, as at 107, to the lower end of the associated bracket 93. A chain 109 is connected, as at 111, at its lower end to the shield and at its upper end is connected to a clip 113 fixed to the associated lower cultivator rig link 29. Preferably, the clip 113 carries a hook bolt 114 with which a selected link of the chain 109 is engaged, so that when the rig beams 21 are raised, the upward swinging of the lower links 29 also raises the shields 81. The shields 81, it will be noted, are adjusted laterally with the front tools relative to the associated rear tools.

By virtue of the construction described above, an operator at station S on the tractor has an excellent view of the plant row being cultivated, the tractor 1 being a four wheel tractor and passing along a single row substantially midway underneath the tractor. By virtue of the fact that the frame bars 35 have their forward ends 36 extended laterally inwardly, it will be seen that there is no obstruction to the operator's vision of the row by any parts being placed laterally inwardly of the rig-supporting parallel links 28 and 29. Also, the rig raising and lowering rods 52 extend rearwardly a distance sufficient to accommodate tilting of the front axle structure 5 about the longitudinal axis defined by the shaft 4. The particular form of the front tool 75 is substantially the same as that shown in the copending application filed February 9, 1946, by Theophilus Brown, Serial No. 646,597, issued November 20, 1951 as United States Patent 2,575,510. This particular tool is admirably adapted for use in the restricted space afforded by the cultivator construction just described.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. The combination with a tractor having steerable wheel means swingable about a generally vertical axis from a position angled in one direction relative to the line of forward travel of the tractor to a position angled in the other direction relative to the line of forward travel of the tractor, of a cultivator comprising a support carried by the tractor and including a tool-receiving portion disposed in a position adjacent said vertical axis and the steerable wheel means swingable about said axis, and generally within the included angle between the two extreme positions of said wheel means, a tool-carrying part, a ground-working tool fixed thereto, and means connecting said tool-carrying part with said support including a pair of members connected for movement, one relative to the other, in a direction generally parallel to the plane of said wheel means in one of said positions, and adjustable means securing said members against relative movement.

2. The combination with a tractor having a front axle and dirigible wheels swingably connected with the end portions of said axle, said cultivator comprising a pair of frame bars fixed to the tractor and disposed in vertical, generally fore-and-aft extending planes spaced laterally inwardly, respectively, of said dirigible wheels and laterally inwardly of the latter when said wheels are turned from one extreme steering position to the other, a pair of generally fore-and-aft extending rig beams having their forward ends adjacent said planes, respectively, and their rear portions extending laterally outwardly and rearwardly into positions generally in rear of said dirigible wheels, means connected with said rig beams for connecting the forward portions of said rig beams with said frame bars, respectively, the forward ends of said rig beams extending in a generally fore-and-aft direction to points lying relatively close to a line extending transversely of the tractor and connecting the steering axes of said dirigible wheels, said points also lying substantially directly inwardly of the steering axes of said dirigible wheels, ground-working tool means carried by the rear portions of said rig beams generally rearwardly of said wheels, a pair of forward tools, and means connecting each of the latter tools with the forward portion of the associated rig beam for adjustment in a generally lateral direction toward and away from the steering axis of the associated dirigible wheel, whereby in any adjusted position of the forward tools, the latter clear the dirigible wheels in any position of steering of the latter.

KEITH R. SCHOLFIELD.

REFERENCES CITED

The following references are of record in the file of this patent:

UNITED STATES PATENTS

| Number | Name | Date |
| --- | --- | --- |
| 265,830 | Knight | Oct. 10, 1882 |
| 481,708 | Ward | Aug. 30, 1892 |
| 535,437 | Young | Mar. 12, 1895 |
| 1,491,324 | Thoma et al. | Apr. 22, 1924 |
| 1,647,658 | Palmer | Nov. 1, 1927 |
| 1,687,457 | Krieder | Oct. 9, 1928 |
| 2,065,174 | Dutour | Dec. 22, 1936 |
| 2,070,155 | Day, Jr. | Feb. 9, 1937 |
| 2,221,549 | Lindgren et al. | Nov. 12, 1940 |
| 2,228,490 | Smith | Jan. 14, 1941 |
| 2,241,276 | Smith | May 6, 1941 |
| 2,296,501 | Carlson | Sept. 22, 1942 |
| 2,319,047 | Fell | May 11, 1943 |
| 2,338,374 | Baldwin | Jan. 4, 1944 |
| 2,378,615 | Brown | June 19, 1945 |
| 2,417,597 | Hill | Mar. 18, 1947 |